United States Patent
Landa et al.

(10) Patent No.: US 8,990,622 B2
(45) Date of Patent: Mar. 24, 2015

(54) POST-SILICON VALIDATION USING A PARTIAL REFERENCE MODEL

(75) Inventors: Shimon Landa, Kiryat Yam (IL); Amir Nahir, Kfar Vitkin (IL)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/561,036

(22) Filed: Jul. 29, 2012

(65) Prior Publication Data

US 2014/0032969 A1   Jan. 30, 2014

(51) Int. Cl.
*G06F 11/00* (2006.01)

(52) U.S. Cl.
USPC .......................................................... 714/28

(58) Field of Classification Search
USPC .......................................................... 714/45
See application file for complete search history.

(56) References Cited

U.S. PATENT DOCUMENTS

| | | | | |
|---|---|---|---|---|
| 7,020,852 B2 * | 3/2006 | Oeltjen et al. | ................. | 716/136 |
| 7,200,778 B2 * | 4/2007 | Johnson | ...................... | 714/47.1 |
| 7,448,004 B1 * | 11/2008 | Brown | ........................... | 716/106 |
| 7,945,888 B2 * | 5/2011 | Adir et al. | ...................... | 716/136 |
| 8,667,255 B2 * | 3/2014 | Alapati et al. | ................. | 712/227 |
| 8,806,270 B2 * | 8/2014 | Adir et al. | .......................... | 714/11 |
| 8,832,502 B2 * | 9/2014 | Dusanapudi et al. | ........... | 714/33 |
| 2003/0065980 A1 * | 4/2003 | Shaw et al. | ...................... | 714/38 |
| 2003/0131221 A1 * | 7/2003 | Lloyd | ........................... | 712/245 |
| 2004/0225973 A1 * | 11/2004 | Johnson | ........................... | 716/4 |
| 2004/0225974 A1 * | 11/2004 | Johnson | ........................... | 716/4 |
| 2006/0052997 A1 * | 3/2006 | Burns et al. | ..................... | 703/22 |
| 2008/0104471 A1 * | 5/2008 | Casillas et al. | ................ | 714/738 |
| 2009/0222694 A1 * | 9/2009 | Adir et al. | ........................ | 714/26 |
| 2010/0042396 A1 * | 2/2010 | Cassani et al. | .................. | 703/13 |
| 2010/0070230 A1 * | 3/2010 | Kumar et al. | .................. | 702/119 |
| 2011/0087861 A1 * | 4/2011 | Bertacco et al. | ............. | 712/202 |
| 2012/0117424 A1 * | 5/2012 | Ben-Yehuda et al. | .......... | 714/26 |
| 2013/0013246 A1 * | 1/2013 | Adir et al. | ...................... | 702/117 |
| 2014/0032966 A1 * | 1/2014 | Dusanapudi et al. | ........... | 714/32 |

\* cited by examiner

*Primary Examiner* — Amine Riad
(74) *Attorney, Agent, or Firm* — Ziv Glazberg

(57) ABSTRACT

Method, system and product for post silicon validation using a partial reference model. The method performed by a device having registers, the method comprising: first executing, by the device when operating in trace mode, a test-case, wherein during the execution utilizing a partial reference model to determine an expected value of at least one register; second executing, by the device when operating in non-trace mode, the test-case; and in response to said second executing, checking values of registers based on, at least in part, values determined during said first execution.

10 Claims, 3 Drawing Sheets

POST-SILICON VALIDATION USING A PARTIAL REFERENCE MODEL

TECHNICAL FIELD

The present disclosure relates to verification in general, and to hardware verification in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware of a marketed product may be expensive to fix, as patching it requires call-back of the computerized device. Hence, many developers of computerized devices invest a substantial portion of the development cycle to discover erroneous behaviors of the computerized device.

The target computerized system may be a processor, a microprocessor, an electronic circuit, an integrated circuit, a chipset, a computerized device comprising a processor or the like. Testing such devices may comprise one or more pre-silicon stages and/or one or more post-silicon stages.

During the pre-silicon stages, devices are generally tested in a computerized environment simulating the functionality of the devices, such as using HDL simulator, and hardware accelerators. In pre-silicon stages, the target computerized system may be described using a descriptive language, such as for example Verilog or VHDL.

Post-silicon validation and debug is generally the last step in the functional verification of a computerized device. Post-silicon validation tests occur on the actual hardware, generally running at-speed in commercial, real-world system boards.

BRIEF SUMMARY

One exemplary embodiment of the disclosed subject matter is a computer-implemented method, the method performed by a device, wherein the device having registers, the method comprising: first executing, by the device when operating in trace mode, a test-case, wherein during the execution utilizing a partial reference model to determine an expected value of at least one register; second executing, by the device when operating in non-trace mode, the test-case; and in response to said second executing, checking values of registers based on, at least in part, values determined during said first execution.

Another exemplary embodiment of the disclosed subject matter is a computer program product embedded a non-transitory computer readable medium, wherein said computer program product is a post-silicon testing program of a device; wherein said non-transitory computer readable medium retaining a partial reference model of the device; and wherein said non-transitory computer readable medium retaining instructions for the device, which instructions when read by the device, cause the device to utilize the partial reference model when executing a reference pass of a test-case.

Yet another exemplary embodiment of the disclosed subject matter is a computer program product comprising: a non-transitory computer readable medium retaining program instructions, which instructions when read by a device, cause the device to perform the steps of: first executing, by the device when operating in trace mode, a test-case, wherein during the execution utilizing a partial reference model to determine an expected value of at least one register; second executing, by the device when operating in non-trace mode, the test-case; and in response to said second executing, checking values of registers based on, at least in part, values determined during said first execution.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
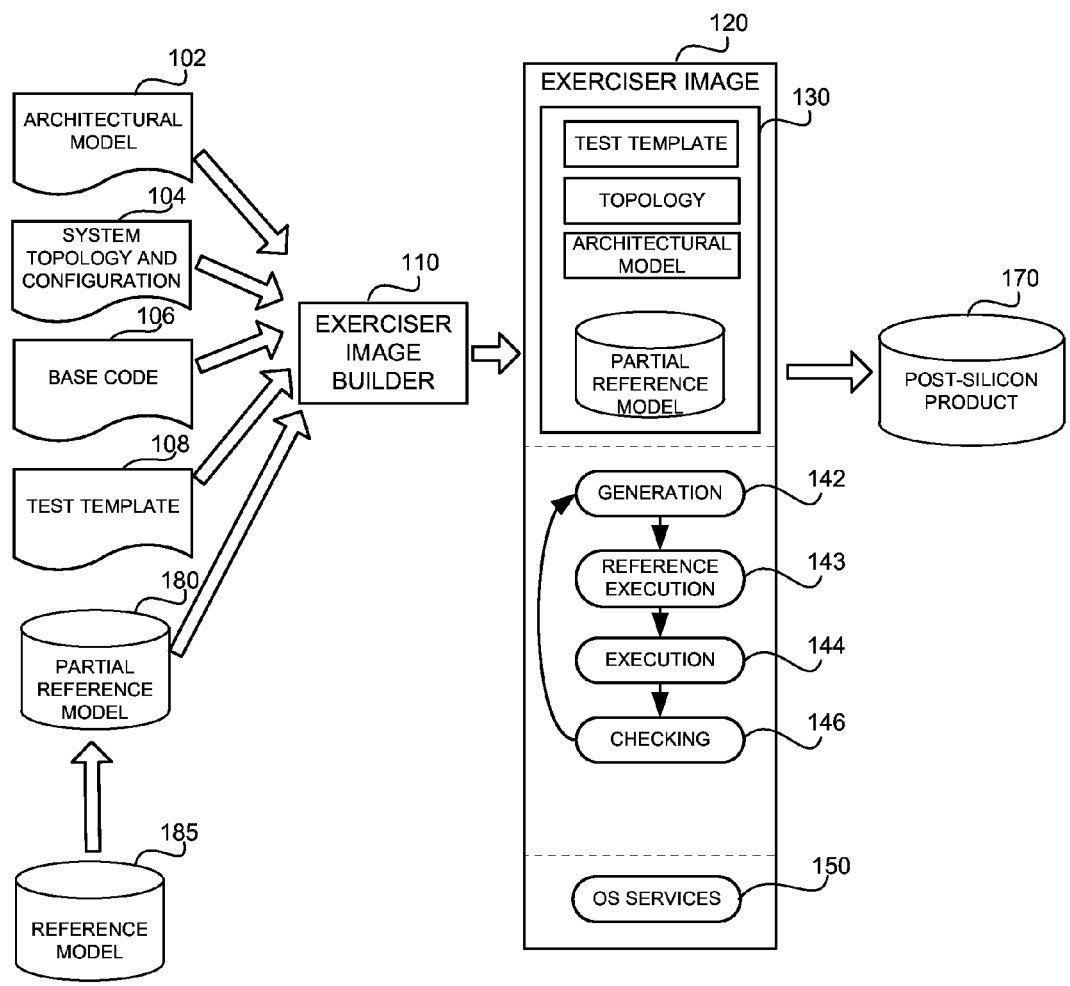
FIG. 1 shows an illustration of a computerized environment in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, the post-silicon stage may refer to a stage once the target computerized system has been fabricated. The target computerized system is generally referred to as post-silicon product. For example, the post-silicon stage may be after the target computerized system is produced in accordance with a description provided in a descriptive language. It will be noted that the circuit may be different than a finalized product, such as for example comprising only a chip without a casing, being assembled manually, being only partially assembled, a manufactured wafer, or the like.

In the present disclosure, a "device" is a post-silicon product and it may also be referred to as a circuit, a silicon, a processor, and as a hardware device.

Modern chips may comprise hundreds of thousands of logic elements and a large number of functionalities and features. It is therefore highly time consuming to thoroughly test the chip and verify its functional correctness. On the other hand, due to business-related reasons, it may be of high importance that the chip is released on time without undue delays. The time window that is thus available for testing is bounded by receiving the device from the semiconductor fabrication plant (FAB) on the one hand, and the expected release date on the other hand.

An exerciser is a post-silicon testing program useful for verification. An exerciser is a program that is configured to be loaded to a device and be executed by the device. Once executed, the exerciser repeatedly generates test-cases, executes them, and checks their behavior or results. The post-silicon system is a "bare metal platform" providing no Operating System (OS) functionality. Therefore, the exerciser may require comprise additional layers of software (e.g., as provided by an OS) to be used when generating a test-case.

In the present disclosure, a "test-case" is a set of stimuli to a device. The test-case may comprise instructions for the device to process. The test-case may further comprise initialization values to registers of the device.

In some exemplary embodiments, the device may execute a test-case in a "non-intrusive" manner. In the present disclosure, a non-intrusive manner may indicate that the instructions of the test-case without interference. An intrusive execution, such as when the device operates in a trace mode, may enable execution of additional instructions before the test-case ends. Trace mode is a mode of the device in which after execution of an instruction of a loaded program (e.g., the test-case), the device allows for execution of other instructions. In some exemplary embodiments, the device may raise an interrupt after execution of each instruction thereby allowing for an interrupt handler to instruct the device to execute instructions that are not required by the test-case.

In the present disclosure, a "register" of the device refers to a memory element for storing and reading bits of information by the device. Wikipedia states that "a hardware register stores bits of information, in a way that all the bits can be written to or read out simultaneously. The hardware registers inside a central processing unit (CPU) are called processor registers.". The disclosed subject matter is not limited to such hardware registers and may refer to any memory element useful for defining a state of the device.

One technical problem dealt with by the disclosed subject matter is to provide for a post-silicon validation of a device. In some exemplary embodiments, the validation is able to check correctness of the execution and not simply consistency of results. As an example, the post-silicon validation may determine that the outcome 3 of executing 1+1 is incorrect even in case that the device consistently computes 1+1 to be 3.

Another technical problem is to check correctness of the operation of the device that is not solely based on consistency of outputs in multiple executions.

Yet another technical problem is to provide a post-silicon testing program that is loadable by the device that is able to check correctness of outputs without solely relying on previous executions of the same test-case by the device. It will be noted that the memory volume coupled to the device is generally small, and may be limited to several KBs or MBs. As such, the size of the post-silicon testing program may be under a strict size restriction which may not allow to include a reference model. In some exemplary embodiments, as the post-silicon testing program is configured to be executed on a bare-metal platform, it may be limited in the complexity of the program, such as for example it may not have at its disposal library functions useful for complex computations.

One technical solution is to make use of a partial reference model by the post-silicon testing program. The partial reference model may be useful for determining expected outcomes for only a portion of the potential states of the device.

In some exemplary embodiments, the partial reference model may be limited to type of instructions, such as to Floating Point (FP) instructions, compression instructions, encryption instructions, or the like. Additionally or alternatively, the partial reference model may provide for expected results of the instructions only for a subset of the possible input values.

In some exemplary embodiments, the partial reference model may be implemented as a computer program that computes expected outcomes on-the-fly in a dynamic manner. Additionally or alternatively, the partial reference model may be implemented as a static table including a combination of input values and corresponding expected outcomes. It will be appreciated that a retaining a full reference model as a static table may not be feasible due to the a potential large number of alternative input value combinations, which may result in a table that requires a substantial and impractical memory space such as of at least several dozen MBs, and possible several GBs, TBs, or even more.

As the partial reference model may not provide full information regarding the state of the device after every instruction (e.g., as some of the instructions and/or inputs thereof may not be supported), a reference pass on a test-case may be performed to complement information using the device. For example, it may be determined that the initial state of the test-case requires that R3 be assigned a particular value in accordance with the partial reference model. The reference pass may be used to ensure that R3 is not overwritten by another instruction whose actions are not predicted by the partial reference model, and therefore the value of the R3 register at the end of the test-case can be predicted by the partial reference model.

Additionally or alternatively, the reference pass may be used to collect information for consistency check in addition to correctness with respect to the partial reference model. The reference pass may be validated for correctness in accordance with the partial reference model, when possible. The outcome of the reference pass, such as the state of the device at the end of the test-case (e.g., values of the registers) may be collected. Outcomes of additional executions of the test-case, which may be performed in an instructive or a non-intrusive manner, may be compared to the outcome of the reference pass.

Another technical solution is to generate the test-case in a biased manner that is directed towards generating instructions and input values thereof that are supported by the partial reference model. In some exemplary embodiments, an exerciser may be configured to generate the test-case. The exerciser may be operatively coupled to the partial reference model and may select an instruction and/or input values to be provided to the instruction based on the instructions and value combinations that are supported by the partial reference model.

Yet another technical solution is to derive a partial reference model from a full reference model and to embed the partial reference model within a generated exerciser.

One technical effect is to provide for a multi-pass post-silicon validation scheme which is not based solely on consistency checks.

Another technical effect is to provide for a post-silicon testing program of an adequately small size to be loaded by the device.

Yet another technical effect is to provide a post-silicon testing program executable on a bare-metal system, that is capable of providing predictions to complex instructions.

Yet another technical effect is to enable usage of a reference model in the post-silicon stages. IT will be noted that the post-silicon platform generally provides a significantly higher execution speed, enabling much faster execution of test-cases, resulting in greater coverage, than the pre-silicon platforms (e.g., HDL simulators, emulators, hardware accelerators, or the like). Therefore, an additional technical effect is to allow partial usage of the reference model information during the many test-cases that are covered during the post-silicon stage.

In the disclosure below the partial reference model is disclosed as relating to Floating Point (FP) instructions of a Floating Point Unit (FPU). However, the disclosed subject matter is not limited in such a manner, and such representation is provided solely for the clarity of disclosure.

Referring now to FIG. 1, showing an illustration of a computerized environments in accordance with some exemplary embodiments of the disclosed subject matter.

An Exerciser Image Builder 110 may be configured to generate an Exerciser Image 120. Exerciser Image Builder 110 may be a computerized tool, such as implemented in hardware, software, a combination thereof, or the like. Exerciser Image Builder 110 may be configured to take different inputs as data which based thereon Exerciser Image 120 may be built.

In some exemplary embodiments, Architectural Model 102 may be provided as input, and portions thereof may be inserted to a Data Section 130 of Exerciser Image 120. Architectural model 102 may be utilized by Exerciser Image 120 to generate test-cases that invoke different architectural aspects of the target device. Additionally or alternatively, System Topology and Configuration 104 may be provided as input and portions thereof may be retained in Data Section 130. Topology and configuration information may be utilized by Exerciser Image 120 to generate test-cases that test different aspects of the topology and configuration of the target device. Additionally or alternatively, Test Template 108 or a plurality of similar templates may be provided as input and may be retained in Data Section 130 to allow Exerciser Image 120 to perform generation based upon abstract outline of operations provided by the Test Template 108. Additionally or alternatively, Base Code 106 may be provided as input. Base Code 16 may comprise program instructions to be added to Exerciser Image 120. In some exemplary embodiments, Exerciser Image 120 may be based on Base Code 106. The program instructions may be operative to perform generation-execution-checking loop (142, 143, 144, 146). Additionally or alternatively, Base Code 106 may comprise program instruction providing OS services, such as OS Services 150.

In some exemplary embodiments, Exerciser Image Builder 110 may obtain a Partial Reference Model 180 and may be store the Partial Reference Model 180 in Data Section 130. In some exemplary embodiments, Partial Reference Model 180 may be manually defined. In some exemplary embodiments, Partial Reference Model 180 may be a set of instructions useful for dynamically determining excepted results. Additionally or alternatively, Partial Reference Model 180 may comprise the expected results in a static manner, such as in a table. In some exemplary embodiments, Partial Reference Model 180 may be derived from a (full) Reference Model 185. In some exemplary embodiments, Exerciser Image Builder 110 may be configured to build a plurality of Exerciser Images, each time using a different portion of the Reference Model 185.

In some exemplary embodiments, Exerciser Image Builder 110 may be configured to manipulate any input provided to it before storing corresponding data in Data Section 130. In one embodiment, Exerciser Image Builder 110 may strip down information that is not needed by the Exerciser Image 120 and/or may pre-calculate information to reduce amount of data to be retained in the binary image.

In some exemplary embodiments, Exerciser Image 120 may comprise Data Section 130 that may retain useful information such as test template based upon generation of test-cases may be performed, topology and configuration information, architectural model information or the like.

In some exemplary embodiments, Exerciser Image 120 may comprise program instructions designed to cause the target device to repeatedly perform generation of a test-case (142), execution of the test-case in a reference pass (143), executing the test-case in one or more execution cycles (144) and checking results of executing the test-case (146). Checking operations (146) may be based on expected results as determined by the partial reference model during the reference pass 143. As an example, the same test-case may be executed a plurality of times, and the results may be compared for consistency.

Exerciser Image 120 may comprise OS Services 150, an Additional Software Layer (ASL), useful for providing the Exerciser Image 120 with functionality that is not provided by a bare-metal product, such as the target device. OS Services 150 may provide functionalities such as interrupt handlers, address translation, memory management. In some exemplary embodiments, OS Services 150 may be utilized for test-case generation (142).

Exerciser Image 120 may be loaded onto a platform, such as Post-Silicon Product 170. Exerciser Image 120 may be loaded by loading the binary to a memory unit of the platform. Exerciser Image 120 may be executed by the Post-Silicon Product 170 and may cause Post-Silicon Product 170 to generate test-cases, perform a reference pass, execute and check their execution results, thereby enabling verification of the Post-Silicon Product 170.

Figure 2A:
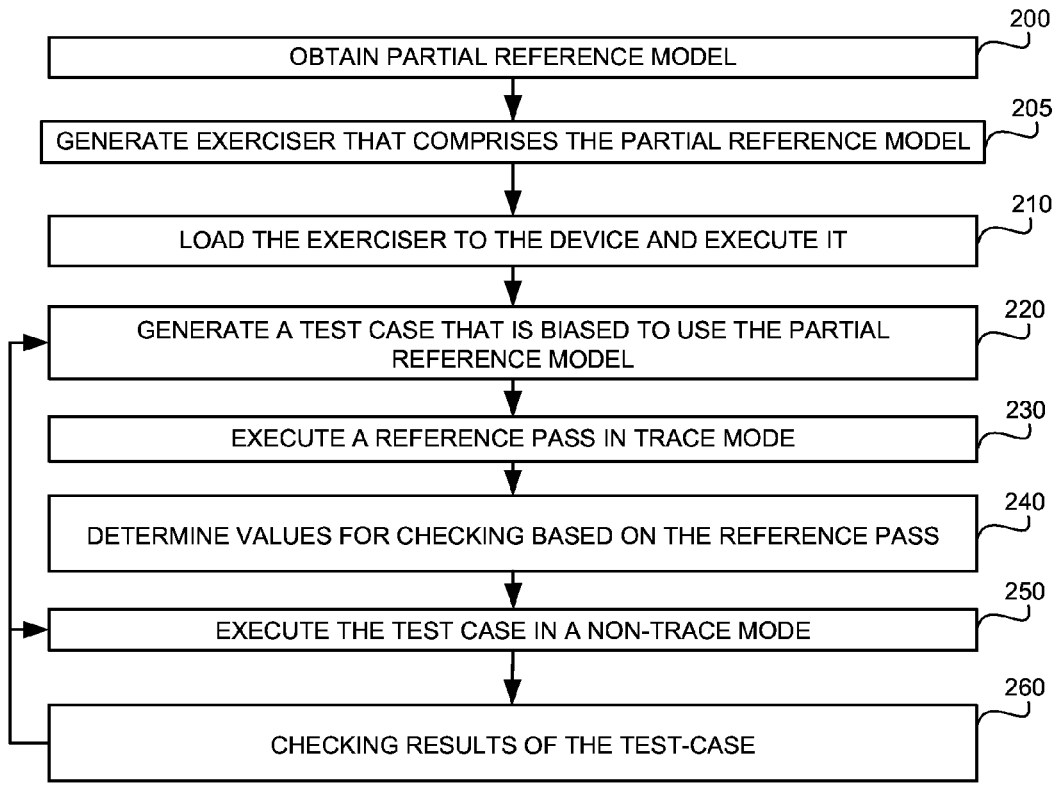
FIG. 2A-2C show flowchart diagrams of steps in methods, in accordance with some exemplary embodiments of the disclosed subject matter.

Referring now to FIG. 2A showing a flowchart diagram of steps in a method, in accordance with some exemplary embodiments of the disclosed subject matter.

In Step 200, a partial reference model is obtained. The partial reference model may be obtained as a program code to be dynamically executed. The partial reference model may be obtained as static data. In some exemplary embodiments, the partial reference model may be derived from a reference model, such as by utilizing the reference model on a subset of possible inputs thereof to determine static data relating to the subset. In some exemplary embodiments, the method of FIG. 2 may be performed a plurality of times, each time deriving a different portion of the reference model and thereby utilizing different partial reference models.

In step 205, an exerciser may be generated. The exerciser may be generated so as to include the partial reference model and be configured to utilize it. The exerciser may be configured to perform generation of a test-case, execution thereof and checking the results of the test-case.

In Step 210, the exerciser may be loaded to the device. The device may used to execute the exerciser.

Steps 220-260 may be performed by the device based on instructions by the exerciser.

In Step 220, the device may generate a test-case. In some exemplary embodiments, the test-case may be generated in a bias manner. The generation may be biased towards subset of instructions and their respective inputs that are supported by the partial reference model.

In some exemplary embodiments, during the generation of the test-case, when an FP instruction is to be generated, the specific FP instruction may be selected based on the FP instructions supported by the partial reference model. Initial values for the input registers used by the selected FP instruction may be determined to be values that are supported by the partial reference model. In some exemplary embodiments, generation of additional instructions may be biased to avoid overwriting the initial values of the input registers. Additionally or alternatively, the generation of additional instructions may be biased to avoid overwriting the value of the target register after the FP instruction is executed. Additionally or alternatively, the generation may be configured to necessarily avoid overwriting the above-mentioned values.

In Step 230, the device the generated test-case by the device in trace mode. During trace mode, after the execution of each instruction, the device may monitor the state of the device (e.g., values of the registers).

In some exemplary embodiments, during the reference pass, the partial reference model may be used to check that an outcome of an instruction is as expected, when applicable. For example, prior to executing the instruction, the state of the device is determined and the partial reference model may be utilized to determine modification of the state in response to executing the instruction. After executing the instruction, the outcome may be compared to the expected outcome. In some exemplary embodiments, an outcome not as expected may indicate a bug in the device.

In Step 240, values for checking a test-case execution may be determined based on the reference pass. In some exemplary embodiments, checking of the test-case in non-reference passes may be performed in a non-intrusive manner (e.g., non-trace mode). Therefore, checking of the outcomes may be limited to the value of registers at the end of the test-case. It will be noted that the end of the test-case is the end of the section of the test-case that is to be performed in a non-intrusive manner and it may include the entire test-case or a portion thereof.

In some exemplary embodiments, consistency checks may be used to check that the state of the device remains the same at the end of each execution of the test-case. In such embodiments, the state of the device at the end of the reference pass may be stored and used for comparison.

In some exemplary embodiments, checking of the non-reference passes may be limited to checking using the predictions of the partial reference model. In such a case, it may be determined values of which registers are predictable at the end of the test-case based on the partial reference model. In some exemplary embodiments, during the reference pass, it may be determined whether or not values are overwritten. As one example, initial values of registers may be overwritten before executing the FP instruction. In such a case the outcome of the FP instruction may not be predictable using only the partial reference model, as the input values of the FP instructions are not predictable themselves. As another example, a value of a target register of the FP instruction may be overwritten so that the value at the end of the test-case may not be determined based on the FP instruction and therefore may not be predictable using the partial reference model. In some exemplary embodiments, if the instruction that overwrites information is predictable using the partial reference model, then the overwritten value may also be predictable and may be checked at the end of the test case.

In Step 250, the test-case may be executed in non-trace mode. In some exemplary embodiments, the test-case may be executed in a non-intrusive manner.

In Step 260, the results of the test-case execution may be checked using the values determined in Step 240.0

In some exemplary embodiments, Steps 250-260 may be performed repeatedly, such as five times, to check operation of the device in a plurality of executions.

Additionally or alternatively, additional test-cases may be generated and checked by the exerciser in Steps 220-260.

Additionally or alternatively, several different exercisers may be generated in steps 205-260.

Figure 2B:
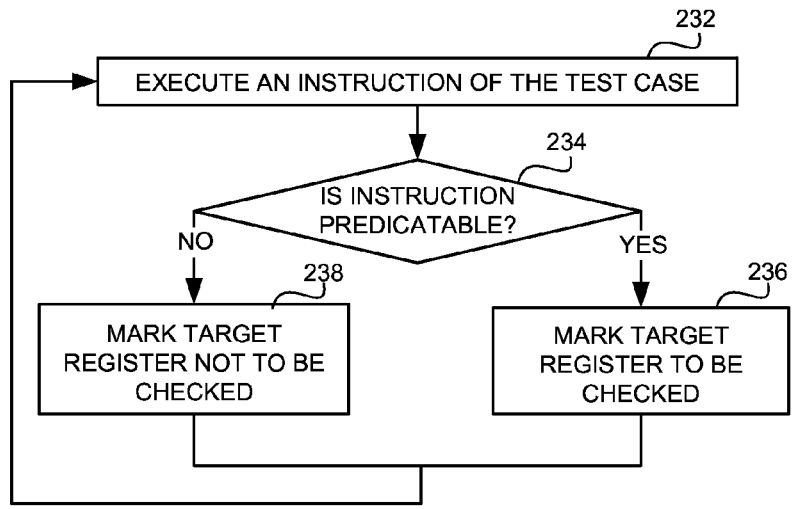

Referring now to FIG. 2B showing a flowchart diagram of steps in a method of executing the test-case in trace mode, in accordance with some exemplary embodiments of the disclosed subject matter.

In Step 232, an instruction to be executed is determined and executed.

In Step 234, it may be determined whether or not the instruction, and in view of the state of the device prior to the execution, can be predicted using the partial reference model. If the outcome can be predicted, the target register of the instruction is marked to be checked (236). In some exemplary embodiments, the value of the target register may be checked to be the same as predicted. In some exemplary embodiments, the expected value may be stored for checking purposes. If the outcome is not predictable, then the target register may be marked not to be checked (Step 238).

In some exemplary embodiments, an instruction may be considered as predictable only if all input registers used by the instruction are either set at the test-case initialization or are market to be checked. In such embodiments, if the value of the any input register is overwritten and the overwritten value is not predictable by the partial reference model, the instruction is considered as not predictable as well.

Figure 2C:
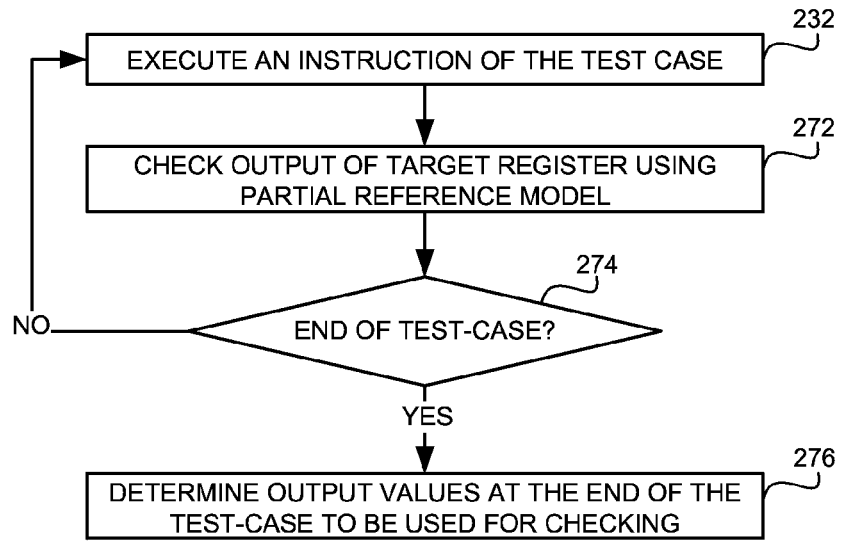

Referring now to FIG. 2C showing a flowchart diagram of steps in a method of executing the test-case in trace mode, in accordance with some exemplary embodiments of the disclosed subject matter.

In Step 232, an instruction to be executed by the test-case is determined and executed.

In Step 272, the output of the target register is compared with the expected value according to the partial reference model.

If the test-case has not ended (274), Steps 232, 272 are performed with respect to the next instruction according to the test-case.

If the test-case has ended, the values at the end of the test-case are determined (276) to be used for checking in consecutive executions that are performed in a non-intrusive manner.

Figure 3:
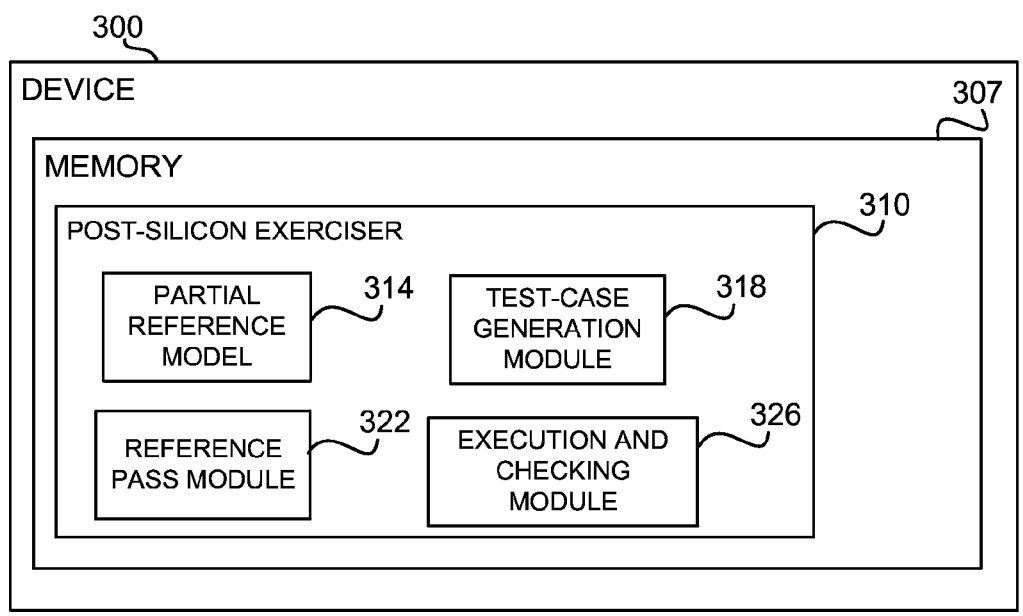
FIG. 3 shows a block diagram of components of a system, in accordance with some exemplary embodiments of the disclosed subject matter.

Referring now to FIG. 3 showing a block diagram of components of a system, in accordance with some exemplary embodiments of the disclosed subject matter.

In some exemplary embodiments, a Device 300 be a Central Processing Unit (CPU), a microprocessor, an electronic circuit, an Integrated Circuit (IC), or the like. Device 300 may be a post-silicon product useful for performing computations, such as performing instructions.

In some exemplary embodiments, Device 300 may comprise a Memory 307. Memory 307 may be a short-term storage device or long-term storage device. Memory 307 may be a persistent storage or volatile storage. Memory 307 may be a disk drive, a Flash disk, a Random Access Memory (RAM), a memory chip, or the like. In some exemplary embodiments, Memory 307 may retain program code operative to cause Device 300 to perform computations.

In some exemplary embodiments, Post-Silicon Exerciser 310, such as 120 of FIG. 1, may be loaded to Memory 307 of Device 300. Post-Silicon Exerciser 310 may be configured to perform test-case generation, test-case execution and checking of results thereof. Post-Silicon Exerciser 310 may be configured to be executed on a bare-metal platform.

Post-Silicon Exerciser 310 may comprise a Partial Reference Model 314, such as 180 of FIG. 1.

Post-Silicon Exerciser 310 may comprise a Test-Case Generation Module 318 for generating test-cases. Test-Case Generation Module 318 may be configured to bias generation towards test-cases that include instructions that are predictable by Partial Reference Model 314.

Post-Silicon Exerciser 310 may comprise a Reference Pass Module 322 for performing a reference pass of the test-case by the Device 300 in trace-mode. In some exemplary embodiments, the reference pass may be utilized to complement information that cannot be predicted by Partial Reference Model 314. Additionally or alternatively, the reference pass may be used to determine expected outcomes, such as based on the Partial Reference Model 314 and/or based on consistency of results in consecutive executions.

Post-Silicon Exerciser 310 may comprise a Execution and Checking Module 326 that may be configured to perform consecutive executions of the test-case and compare the results thereof with the (partial or full) expected outcomes. In some exemplary embodiments, Execution and Checking Module 326 may be configured to execute the test-case in non-trace mode, such as to allow for non-intrusive checking of the execution of the test-case by Device 300.

In some exemplary embodiments, the FPGen™ tool may be used as a partial reference model. FPGen is a test-generation framework that specializes in floating point operations. FPGen produces a set of records, each containing a FP operation, interesting input values, expected output value, and the machine state required for its proper execution.

In accordance with some embodiments of the disclosed subject matter, when generating a FP instruction, a suitable FPGen record is randomly selected. The test-case initializations may be set according to the selected FPGen record. Once the generating of the test-case is finished, the device may initially run the test-case in trace-mode, taking an exception after each instruction, enabling monitoring of the actual input registers values and machine state, hence determining whether they match the values from the corresponding FPGen record. If they do, the target register may be marked as checkable, meaning that after the test-case execution it can checked by comparing its value with the expected output value from the FPGen record (unless it is overridden by a subsequent instruction in the test-case—a case easily detected). The test-case may then be executed several more times, not in trace-mode, and at the end of each execution all the FP registers that are marked as checkable may be checked.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method performed by a device, wherein the device having registers, the method comprising:
   determining an instruction to be generated having a set of input registers and a target register;
   determining a combination of values to the input registers for which a partial reference model provides an expected result;
   generating a test-case including the instruction, wherein the test-case is configured to initialize the input registers with the combination of values;
   first executing, by the device when operating in trace mode, the test-case, wherein during the execution utilizing the partial reference model to determine an expected value of at least one register;
   second executing, by the device when operating in non-trace mode, the test-case;
   in response to said second executing, checking values of registers based on, at least in part, values determined during said first execution.

2. The computer-implemented method of claim 1, wherein the partial reference model is a reference model providing expected values for a strict subset of all possible inputs to an instruction.

3. The computer-implemented method of claim 1, wherein said checking is performed based on the partial reference model and without intrusively interfering with the execution of the test-case.

4. The computer-implemented method of claim 1, wherein said second executing the test-case and checking are preformed repeatedly with respect to the test-case to check for consistency.

5. The computer-implemented method of claim 1, wherein said first executing the test-case, said second executing the test-case and said checking are performed based on instructions in a post-silicon testing program which is retained by a memory of the device, wherein the post-silicon testing program comprising the partial reference model.

6. The computer-implemented method of claim 5, wherein the partial reference model is derived from a full reference model in order to be comprised by the post-silicon testing program.

7. The computer-implemented method of claim 1, wherein said first executing comprises:
   monitoring values of the registers after execution of each instruction of the test-case;
   determining the expected value of the at least one register after performing an instruction of the test-case based on the partial reference model; and
   verifying that the value of the at least one register is not overwritten after the instruction is executed and before test-case ends.

8. The computer-implemented method of claim 1, wherein the trace mode is an intrusive mode of operation in which in response to an instruction of the test-case being performed the device interrupts the execution and allows for execution of instructions that are not comprised by the test-case.

9. The computer-implemented method of claim 1, wherein the partial reference model is a reference model relating to instructions selected from the group consisting of: floating point instructions, encryption instructions and compression instructions.

10. A computer program product comprising:
   a non-transitory computer readable medium storing program instructions, which instructions when executed by a device, cause the device to perform the steps of:
   determining an instruction to be generated having a set of input registers and a target register;
   determining a combination of values to the input registers for which a partial reference model provides an expected result;
   generating the test-case including the instruction, wherein the test-case is configured to initialize the input registers with the combination of values;
   first executing, by the device when operating in trace mode, the test-case, wherein during the execution utilizing the partial reference model to determine an expected value of at least one register;
   second executing, by the device when operating in non-trace mode, the test-case;
   in response to said second executing, checking values of registers based on, at least in part, values determined during said first execution.

* * * * *